US012801881B2

(12) United States Patent
D'Armancourt et al.

(10) Patent No.: US 12,801,881 B2
(45) Date of Patent: Nov. 17, 2026

(54) PRINTER AND METHOD FOR ENCODING A RADIO FREQUENCY IDENTIFICATION TAG

(71) Applicant: Hand Held Products, Inc., Charlotte, NC (US)

(72) Inventors: Sebastien Michel Marie Joseph D'Armancourt, Singapore (SG); Chi Ling Li, Singapore (SG); Yu Cheng Lim, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 232 days.

(21) Appl. No.: 18/680,665

(22) Filed: May 31, 2024

(65) Prior Publication Data

US 2025/0371300 A1 Dec. 4, 2025

(51) Int. Cl.

*G06K 19/00* (2006.01)
*G06K 1/12* (2006.01)
*G06K 17/00* (2006.01)
*G06K 19/07* (2006.01)

(52) U.S. Cl.

CPC ......... *G06K 17/0025* (2013.01); *G06K 1/121* (2013.01); *G06K 19/0723* (2013.01)

(58) Field of Classification Search

CPC . G06K 17/0025; G06K 1/121; G06K 19/0723
USPC ........................................................ 358/1.15
See application file for complete search history.

(56) References Cited

U.S. PATENT DOCUMENTS

| | | | | |
|---|---|---|---|---|
| 9,971,917 | B2 | 5/2018 | Duckett et al. | |
| 10,114,993 | B2 | 10/2018 | Torchalski et al. | |
| 10,255,535 | B1 * | 4/2019 | Takada | G06K 17/0025 |
| 10,592,794 | B2 * | 3/2020 | Duckett | G06K 7/10366 |
| 2021/0142020 | A1 * | 5/2021 | Casavant | G06K 19/06028 |
| 2022/0161572 | A1 | 5/2022 | Arai | |
| 2024/0412012 | A1 * | 12/2024 | d'Armancourt | B41J 3/50 |

FOREIGN PATENT DOCUMENTS

JP 4587686 B2 11/2010

* cited by examiner

*Primary Examiner* — Gabriel I Garcia
(74) *Attorney, Agent, or Firm* — Alston & Bird LLP

(57) ABSTRACT

A method for encoding a radio frequency identification (RFID) tag comprises identifying, via one or more processors, a print position of a RFID tag of a RFID label integrated within a printer. Further, determining, via the one or more processors, whether the print position of the RFID tag identified within the printer overlaps with a RFID communication window of a RFID antenna placed in proximity to RFID tag. Furthermore, moving, via the one or more processors, the RFID tag within the print position upon determining print position of the RFID tag overlaps with the RFID communication window. Further, encoding, via the one or more processors, the RFID tag using the RFID antenna upon movement of the RFID tag within the print position. Thereafter, forwarding, via the one or more processors, the RFID tag encoded for printing one or more encoded information over the RFID tag using printer.

14 Claims, 4 Drawing Sheets

PRINTER AND METHOD FOR ENCODING A RADIO FREQUENCY IDENTIFICATION TAG

TECHNOLOGICAL FIELD

Example embodiments of the present disclosure relate generally to printers, and more particularly, to a printer and a method for encoding a radio frequency identification (RFID) tag.

BACKGROUND

Radio frequency identification (RFID) printers are used in programming an RFID tag of a label. The necessity for programming the RFID tag using the RFID printer arises from a requirement to embed unique identification data onto the RFID tag to facilitate efficient tracking and management of items across various industries. In an operational flow of a conventional RFID printer, a label is aligned with a tear bar when the RFID printer is in rest mode. Then, to begin the printing and encoding processes, the RFID printer retracts the label to program the RFID tag and subsequently moves forward to the rest position, realigning the label with the tear bar. The RFID printer further retracts to the print position to begin printing and then moves forward to continue printing. This operational flow of a conventional RFID printer results in unnecessary retract and feed forward motion to create the label, resulting in a reduction in overall throughput of and wear-and-tear on the RFID printer.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a summary of some example embodiments to provide a basic understanding of some aspects of the present disclosure. This summary is not an extensive overview and is intended to neither identify key or critical elements nor delineate the scope of such elements. It will also be appreciated that the scope of the disclosure encompasses many potential embodiments in addition to those here summarized, some of which will be further described in the detailed description that is presented later.

In an example embodiment, a method is disclosed. The method comprises identifying, via one or more processors, a print position of a radio-frequency identification (RFID) label positioned at least partially within a printer and relative to a printhead of the printer. Further, the method comprises determining, via the one or more processors, that a position of the RFID label in the print position would result in an RFID tag of the RFID label being within an RFID communication window of an RFID antenna of the printer. Furthermore, the method comprises moving the RFID label to the print position in response to the determination that the position of the RFID label in the print position would result in the RFID tag of the RFID label being within the RFID communication window of the RFID antenna of the printer. Further, the method comprises encoding, via the one or more processors, the RFID tag using the RFID antenna while the RFID label is in the print position. Thereafter, the method comprises printing, with the printhead of the printer, text, images, or machine-readable symbology onto the RFID label while the RFID label is at least in the print position.

In some embodiments, the method comprises identifying, via the one or more processors, a size of the RFID communication window for the RFID tag using an RFID calibration wizard.

In some embodiments, wherein the RFID communication window corresponds to a position of the RFID tag relative to the RFID antenna where the RFID antenna is capable of communicating with the RFID tag for encoding the RFID tag.

In some embodiments, the method further comprising determining, via the one or more processors, that a position of a second RFID label in a respective print position would result in a second RFID tag of the second RFID label not overlapping the RFID communication window of the RFID antenna of the printer. Further, the method comprising moving the second RFID label to an encoding position in response to the determination that the position of the second RFID label in the respective print position would result in the second RFID tag of the second RFID label not overlapping the RFID communication window of the RFID antenna of the printer. Thereafter, the method comprising encoding, via the one or more processors, the second RFID tag using the RFID antenna while the second RFID tag is in the encoding position.

In some embodiments, the method further comprising moving the second RFID tag from the encoding position to the respective print position; and printing, with the printhead of the printer, text, images, or machine-readable symbology onto the RFID label while the RFID label is at least in the print position.

In some embodiments, the method further comprising creating, via a platen roller, an optimum pressure over the RFID label to drive the RFID label for printing.

In another example embodiment, a printer is disclosed. The printer comprises an RFID label placed over a liner. Further, the printer comprises an RFID antenna of the printer, configured to communicate with an RFID tag of the RFID label. Further, the printer comprises one or more processors communicatively coupled with the RFID antenna. The one or more processors are configured to identify a print position of the RFID label positioned at least partially within the printer and relative to a printhead of the printer. Further, the one or more processors are configured to determine whether a position of the RFID label in the print position would result in the RFID tag of the RFID label being within an RFID communication window of the RFID antenna of the printer. Furthermore, the one or more processors are configured to move the RFID label to the print position in response to the determination that the position of the RFID label in the print position would result in the RFID tag of the RFID label being within the RFID communication window of the RFID antenna of the printer. Further, the one or more processors are configured to encode the RFID tag using the RFID antenna while the RFID label is in the print position. Thereafter, the one or more processors are configured to print, with the printhead of the printer, text, images, or machine-readable symbology onto the RFID label while the RFID label is at least in the print position.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below.

BRIEF DESCRIPTION OF THE DRAWINGS

Figure 1A:
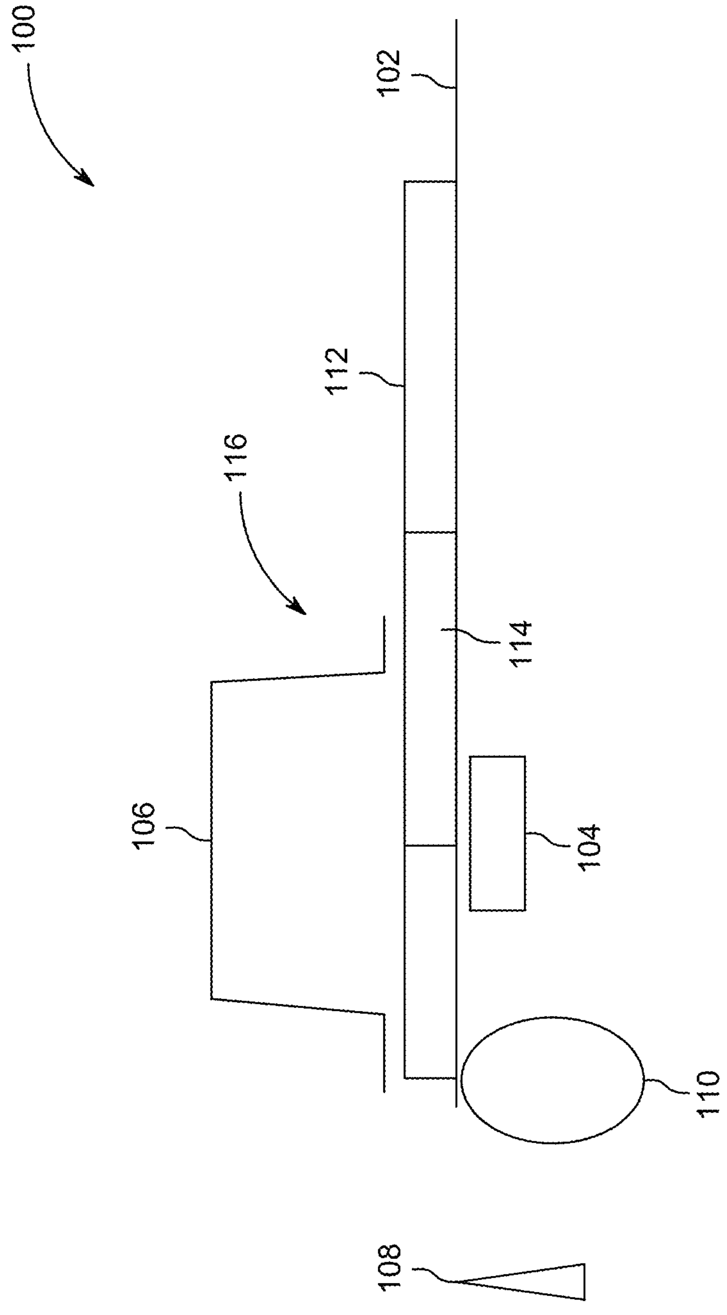
Figure 1B:
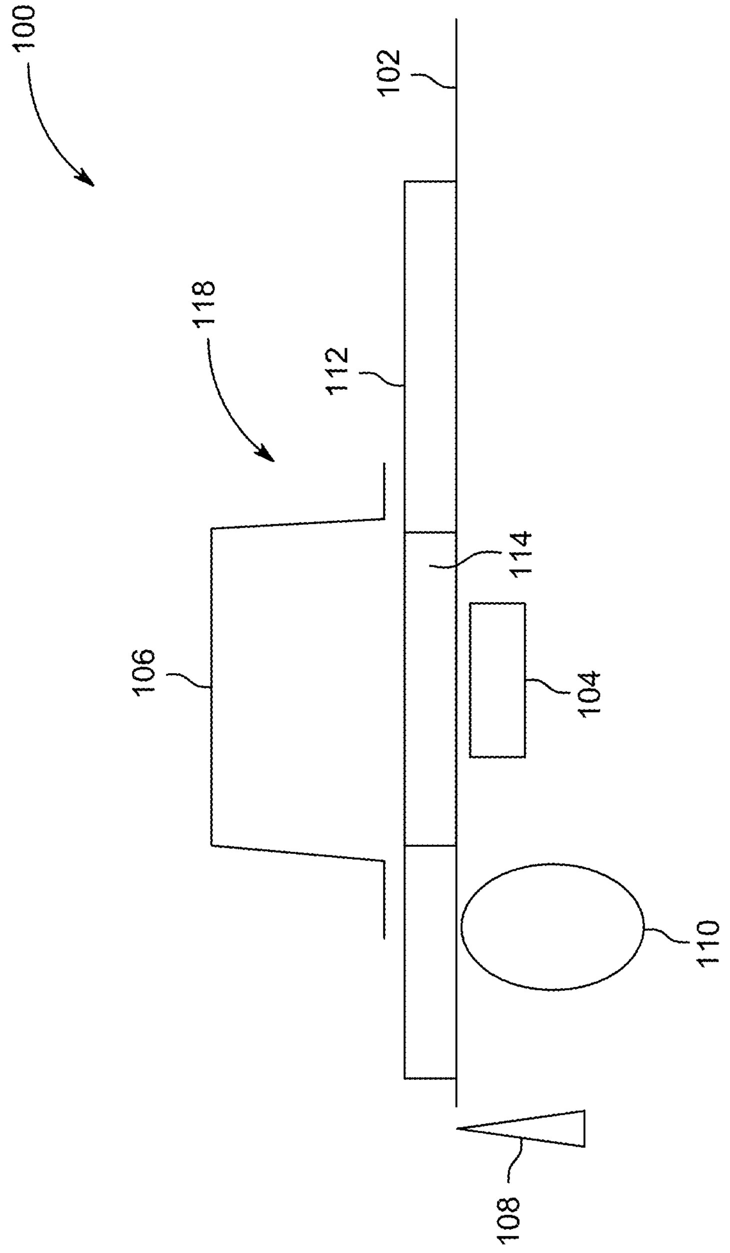
Figure 1C:
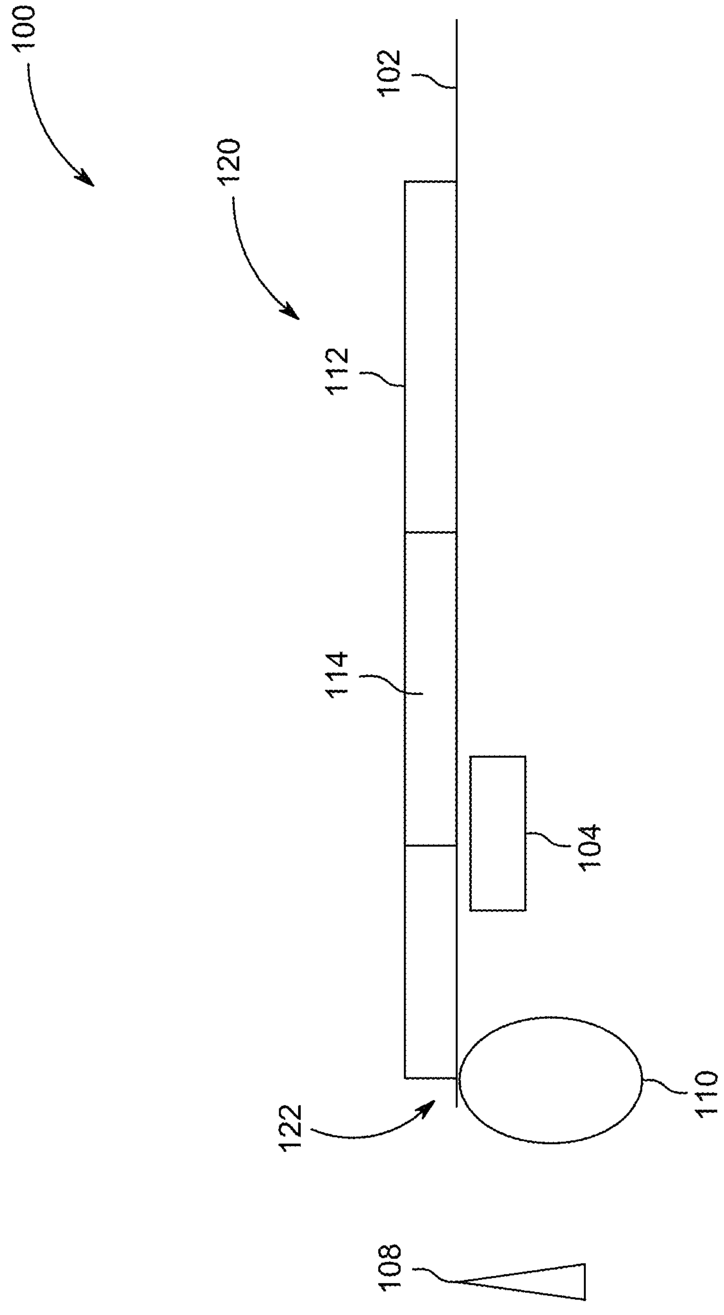
Figure 2:
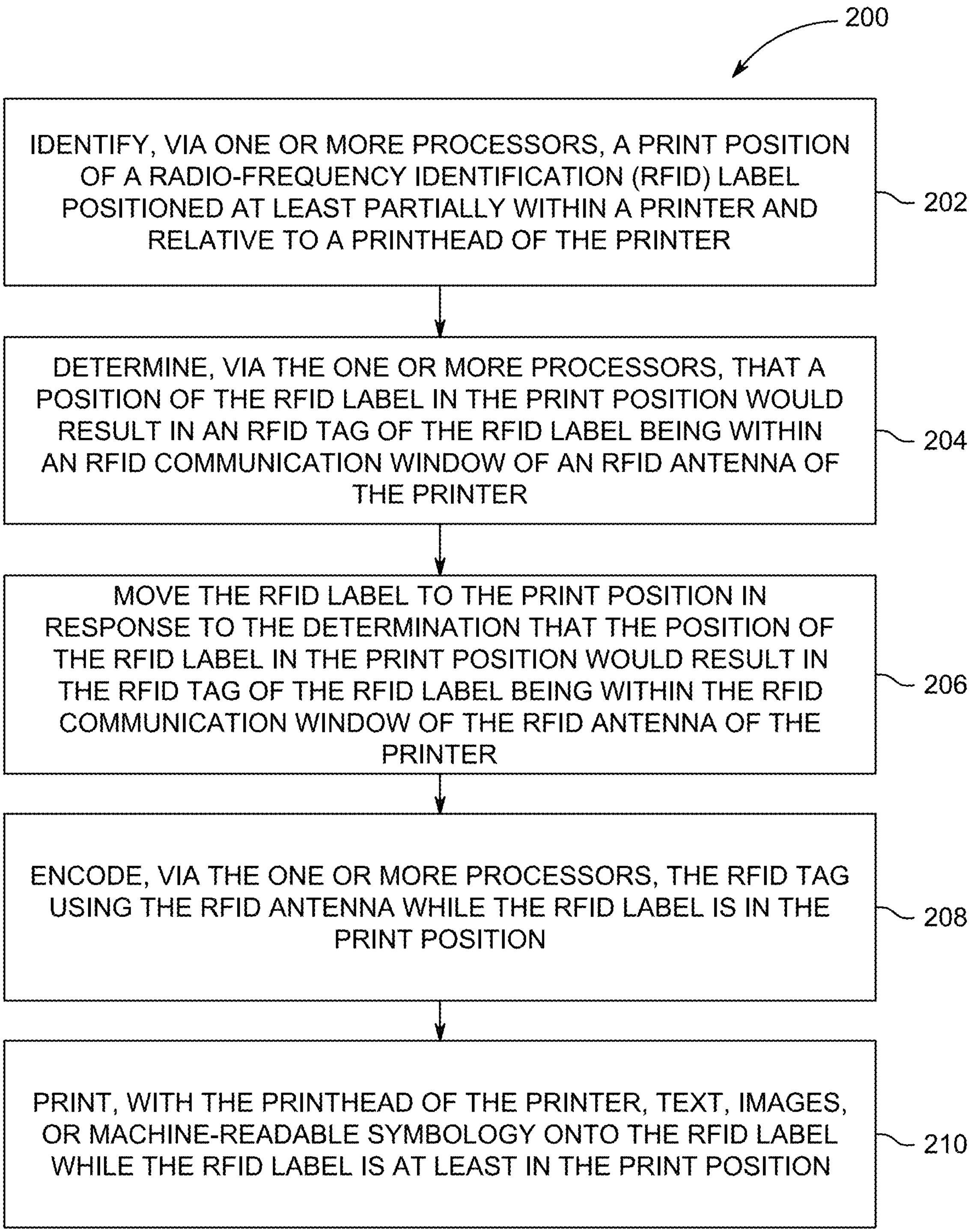

Having thus described certain example embodiments of the present disclosure in general terms, reference will hereinafter be made to the accompanying drawings, which are not necessarily drawn to scale, and wherein:

FIGS. 1A-1B illustrate schematic views of a portion of a printer in accordance with an example embodiment of the present disclosure;

FIG. 1C illustrates a schematic view of a label in a print position within the printer in accordance with an example embodiment of the present disclosure; and FIG. 2 illustrates a flowchart showing a method for the printer in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As discussed herein, the protection devices may be referred to use by humans, but may also be used to raise and lower objects unless otherwise noted.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

The present disclosure provides various embodiments of a printer and a method for encoding a radio frequency identification (RFID) tag. Embodiments may be configured to identify a print position of the RFID label positioned at least partially within the printer and relative to a printhead of the printer. Embodiments may be configured to determine whether a position of the RFID label in the print position would result in the RFID tag of the RFID label being within an RFID communication window of the RFID antenna of the printer. Embodiments may be configured to move the RFID label to the print position in response to the determination that the position of the RFID label in the print position would result in the RFID tag of the RFID label being within the RFID communication window of the RFID antenna of the printer. Embodiments may be configured to encode the RFID tag using the RFID antenna while the RFID label is in the print position. Embodiments may be configured to print, with the printhead of the printer, text, images, or machine-readable symbology onto the RFID label while the RFID label is at least in the print position.

FIGS. 1A-1B illustrate schematic views of a portion of a printer 100 in accordance with an example embodiment of the present disclosure. FIG. 1C illustrates a schematic view of a label in a print position within the printer 100 in accordance with an example embodiment of the present disclosure.

In some embodiments, the printer 100 may comprise an RFID antenna 104, one or more processors (not shown), a tear bar 108, and a platen roller 110. The RFID antenna 104 may define an RFID communication window 106. In some embodiments, a RFID label 112 may be removably coupled toa liner 102. The RFID label 112 may be made of a paper-like media. In one example, the RFID label 112 may comprise an RFID tag 114 embedded within the RFID label 112. In another example embodiment, the RFID label 112 may comprise the RFID tag 114 embedded on the backside of the RFID label 112. The printer 100 may be configured to print ink onto the RFID label 112. Further, the printer 100 may encode the RFID tag 114 that is embedded within the RFID label 112 via the RFID antenna 104. In some embodiments, the RFID antenna 104 of the printer 100 may be positioned in proximity to the RFID label 112. The RFID antenna 104 may be configured to communicate with the RFID tag 114 of the RFID label 112.

In some embodiments, the one or more processors may be communicatively coupled with the RFID antenna 104. The one or more processors may be configured to identify a print position of the RFID label 112. The RFID label 112 may be positioned at least partially within the printer 100. Additionally, the RFID label 112 may be positioned relative to a printhead (not shown) of the printer 100. Further, the one or more processors may be configured to determine whether a position of the RFID label 112 in the print position would result in the RFID tag 114 of the RFID label 112 being within an RFID communication window 106 of the RFID antenna 104, as illustrated in FIG. 1B. The RFID communication window 106 may correspond to a position of the RFID tag 114 relative to the RFID antenna 104 where the RFID antenna 104 is capable of communicating with the RFID tag 114 for encoding the RFID tag 114. In one example, the RFID communication window 106 may be a spatial area around the RFID antenna 104 where the RFID tag 114 may be reliably detected, read, and/or encoded.

In some embodiments, the one or more processors may be configured to identify a size of the RFID communication window 106 for the RFID tag 114. The one or more processors may be configured to identify the size of the RFID communication window 106 using an RFID calibration wizard. The size of the RFID communication window 106 may be dependent on the strength of the RFID antenna 104 and the size and type of the RFID tag 114. Further, for smaller RFID tags, the RFID communication window 106 may be smaller. And, for larger RFID tags, the RFID communication window 106 may be larger. The RFID calibration wizard may adjust one or more RFID antenna 104 parameters. The one or more RFID antenna 104 parameters may comprise at least one of power levels, frequency settings, and antenna orientation. The RFID calibration wizard may further monitor a response of the RFID tag 114 within the vicinity of the RFID communication window 106. As a result, the RFID wizard may identify an optimal configuration that maximizes RFID tag detection within a desired range, thereby, effectively defining the boundaries of the RFID communication window 106.

In some embodiments, the one or more processors may be configured to move the RFID label 112 to the print position, as illustrated by 120 in FIG. 1C. The one or more processors may be configured to move the RFID label 112 in response to the determination that the position of the RFID label 112 in the print position would result in the RFID tag 114 of the RFID label 112 being within the RFID communication window 106 of the RFID antenna 104. In one example embodiment, the one or more processors may be configured to move the RFID label 112 within the print position upon detecting a partial overlapping of the RFID tag 114 with the RFID communication window 106 of the RFID antenna 104, as illustrated by 116 in FIG. 1A. In another example embodiment, the one or more processors may be configured to move the RFID tag 114 within the print position upon detecting a full overlapping of the RFID tag 114 with the RFID communication window 106 of the RFID antenna 104, as illustrated by 118 in FIG. 1B.

In some embodiments, the one or more processors may be configured to encode the RFID tag 114 using the RFID antenna 104. The one or more processors may be configured to encode the RFID while the RFID label 112 is in the print position. Further, the one or more processors may be configured to print, with the printhead of the printer 100, text, images, machine-readable symbology, or the like, onto the RFID label 112. The one or more processors may be configured to print while the RFID label 112 is at least in the print position. In some embodiments, the platen roller 110 may be configured to create an optimum pressure over the RFID label 112 to drive the RFID label 112 for printing. Further, the RFID label 112 may be aligned with a burn line. The burn line may mark an edge of the RFID label 112 to indicate the RFID label 112 in printing position, as illustrated by 122 in FIG. 1C. The RFID label 112 may be configured to be printed with the one or more encoded information. The one or more encoded information may comprise at least one of a display text, numbers, or variables.

Further, a second RFID label (not shown) may be connected next to the RFID tag 114, for encoding and printing. The one or more processors may be configured to determine whether a position of a second RFID label in a respective print position would result in a second RFID tag (not shown) of the second RFID label not overlapping the RFID communication window 106 of the RFID antenna 104 of the printer 100. Further, the one or more processors may be configured to move the second RFID label to an encoding position. The second RFID label may be moved in response to the determination that the position of the second RFID label in the respective print position would result in the second RFID tag of the second RFID label not overlapping the RFID communication window 106 of the RFID antenna 104 of the printer 100. Furthermore, the one or more processors may be configured to encode the second RFID tag using the RFID antenna 104. The second RFID tag may be encoded while the second RFID tag is in the encoding position. Thereafter, the one or more processors may be configured to move the second RFID tag from the encoding position to the respective print position. The one or more processors may be configured to print, with the printhead of the printer 100, text, images, or machine-readable symbology onto the RFID label 112 while the RFID label 112 is at least in the print position.

In some embodiments, the one or more processors may include suitable logic, circuitry, and/or interfaces that are operable to execute one or more instructions stored in a memory to perform predetermined operations. In one embodiment, the one or more processors may be configured to decode and execute any instructions received from one or more other electronic devices or server(s). The one or more processors may be configured to execute one or more computer-readable program instructions, such as program instructions to carry out any of the functions described in this description. Further, the processor may be implemented using one or more processor technologies known in the art. Examples of the processor include, but are not limited to, one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor).

Further, the memory may be communicatively coupled to the one or more processors. Further, the memory may be configured to store a set of instructions and data executed by the one or more processors. Further, the memory may include the one or more instructions that are executable by the one or more processors to perform specific operations. The memory may include one or more instructions to identify a print position of the RFID label 112 positioned at least partially within the printer 100 and relative to a printhead of the printer 100. The memory may include one or more instructions to determine whether a position of the RFID label 112 in the print position would result in the RFID tag 114 of the RFID label 112 being within an RFID communication window 106 of the RFID antenna 104 of the printer 100. The memory may include one or more instructions to move the RFID label 112 to the print position in response to the determination that the position of the RFID label 112 in the print position would result in the RFID tag 114 of the RFID label 112 being within the RFID communication window 106 of the RFID antenna 104 of the printer 100.

The memory may include one or more instructions to encode the RFID tag 114 using the RFID antenna 104 while the RFID label 112 is in the print position. The memory may include one or more instructions to print, with the printhead of the printer 100, text, images, or machine-readable symbology onto the RFID label 112 while the RFID label 112 is at least in the print position. It is apparent to a skilled artisan that the one or more instructions stored in the memory enable the hardware of the system to perform the predetermined operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

In some embodiments, the printer 100 may further comprise the tear bar 108. The tear bar 108 may be located at an edge of the RFID label 112. The tear bar 108 may be configured to provide a designated point for a user to cleanly separate the RFID label 112 and the second RFID label. The tear bar 108 may ensure precise output and facilitate easy handling of the RFID label 112. Further, the platen roller 110 may assist in alignment of the RFID label 112 by gripping the RFID label 112 and guiding the RFID label 112 through the printing process.

It will be apparent to one skilled in the art that the above-mentioned components of the printer 100 have been provided only for illustration purposes, without departing from the scope of the disclosure.

FIG. 2 illustrates a flowchart showing a method 200 for the printer 100, in accordance with an example embodiment of the present disclosure.

At operation 202, the one or more processors may be configured to identify the print position of the RFID label 112 positioned at least partially within the printer 100 and relative to the printhead of the printer 100. For example, a RFID label is positioned at least partially within the printer 100.

At operation 204, the one or more processors may be configured to determine that the position of the RFID label 112 in the print position would result in the RFID tag 114 of the RFID label 112 being within the RFID communication window 106 of the RFID antenna 104 of the printer 100. In some embodiments, the method may comprise identifying, via the one or more processors, the size of the RFID communication window 106 for the RFID tag 114 using the RFID calibration wizard. Further, the RFID communication window 106 may correspond to the position of the RFID tag 114 relative to the RFID antenna 104 where the RFID antenna 104 is capable of communicating with the RFID tag 114 for encoding the RFID tag 114.

For example, the one or more processors determines the position of the RFID label 112 in the print position results in the RFID tag 114 of the RFID label 112 being within the RFID communication window 106 of the RFID antenna 104 of the printer 100.

At operation 206, the one or more processors may be configured to cause movement of the RFID label 112 to the print position in response to the determination that the position of the RFID label 112 in the print position would result in the RFID tag 114 of the RFID label 112 being within the RFID communication window 106 of the RFID antenna 104 of the printer 100. For example, the one or more processors moves the RFID label 112 to the print position in response to the determination that the RFID tag 114 of the RFID label 112 is within the RFID communication window 106 of the RFID antenna 104 of the printer 100.

At operation 208, the one or more processors may be configured to encode the RFID tag 114 using the RFID antenna 104 while the RFID label 112 is in the print position. For example, the one or more processors encodes the RFID tag 114 of the RFID label 112, while the RFID label 112 is in the print position. At operation 210, the one or more processors may be configured to print, with the printhead of the printer 100, text, images, or machine-readable symbology onto the RFID label 112 while the RFID label 112 is at least in the print position. In some embodiments, the platen roller 110 may be configured to create the optimum pressure over the RFID label 112 to drive the RFID label 112 for printing.

For example, the one or more processors prints an image onto the RFID label 112 while the RFID label 112 is at least in the print position.

In some embodiments, the method may further comprise determining, via the one or more processors, that the position of the second RFID label in the respective print position would result in the second RFID tag of the second RFID label not overlapping the RFID communication window 106 of the RFID antenna 104 of the printer 100. Further, the method may comprise moving the second RFID label to the encoding position in response to the determination that the position of the second RFID label in the respective print position would result in the second RFID tag of the second RFID label not overlapping the RFID communication window 106 of the RFID antenna 104 of the printer 100. Furthermore, the method may comprise encoding, via the one or more processors, the second RFID tag using the RFID antenna 104 while the second RFID tag is in the encoding position. In some embodiments, the method may comprise moving the second RFID tag from the encoding position to the respective print position. Thereafter, the method may comprise printing, with the printhead of the printer 100, text, images, or machine-readable symbology onto the RFID label 112 while the RFID label 112 is at least in the print position.

The printer 100 of the present disclosure may streamline the operational flow of the printing process as compared to a conventional RFID printer. For example, the operational flow of a conventional RFID printer requires the label to move from a rest position where the label is aligned with a tear bar to a position within the RFID communication window to encode the RFID tag. After the RFID tag is encoded, the label is moved forward back to the rest position and then subsequently moved to the print position. In contrast, the printer 100 of the present disclosure in some instances moves the label from the rest position to the print position where the RFID tag is encoded and the printing process begins. As compared to a conventional RFID printer, the printer 100 of the present disclosure reduces the amount of move and feed forward motions of the label prior to printing, which may increase overall throughput of the printer 100 and reduce wear-and-tear on the printer 100. Also, the printer 100 of the present disclosure may provide precise alignment, thereby enhancing the accuracy of encoding. Secondly, the ability to determine whether the print position overlaps with the RFID communication window of the antenna may ensure optimal signal reception, leading to reliable encoding of information onto the RFID tag. Additionally, the capability to move the RFID tag within the print position when necessary may not only prevent interference with the communication window but may also safeguards against potential damage during the encoding process. Encoding the RFID tag using the printer's antenna may streamline the workflow, eliminating the need for additional equipment and simplifying the overall operation. Forwarding the encoded RFID tag for printing multiple encoded pieces of information may enhance efficiency, allowing for the simultaneous encoding of various data onto the tag, thereby maximizing productivity and minimizing processing time. The printer and the method may improve reliability, efficiency, and ease of operation within diverse application scenarios.

Many modifications and other embodiments of the disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

identifying, via one or more processors, a print position for a radio-frequency identification (RFID) label, positioned within a printer, based on a position of a printhead in the printer;

identifying, via the one or more processors, an RFID communication window of an RFID antenna for an RFID tag of the RFID label, wherein the RFID communication window corresponds to a region where the RFID antenna is capable of encoding the RFID tag on the RFID label;

determining, via the one or more processors, whether the RFID communication window for the RFID tag on the RFID label overlaps with the identified print position for the RFID label;

causing, via the one or more processors, movement of the RFID label to the print position in response to the determination that the identified print position for the RFID label overlaps with the RFID communication window identified for the RFID tag of the RFID label;

encoding, via the one or more processors, the RFID tag using the RFID antenna while the RFID label is in the print position; and printing, with the printhead of the printer, text, images, or machine-readable symbology onto the RFID label while the RFID label is at least in the print position.

2. The method of claim 1, wherein the method comprises identifying, via the one or more processors, a size of the RFID communication window for the RFID tag using an RFID calibration wizard.

3. The method of claim 1, wherein the RFID communication window corresponds to a position of the RFID tag relative to the RFID antenna where the RFID antenna is capable of communicating with the RFID tag for encoding the RFID tag.

4. The method of claim 1, further comprising:

determining, via the one or more processors, that a position of a second RFID label in a respective print position would result in a second RFID tag of the second RFID label not overlapping the RFID communication window of the RFID antenna of the printer; and moving the second RFID label to an encoding position in response to the determination that the position of the second RFID label in the respective print position would result in the second RFID tag of the second RFID label not overlapping the RFID communication window of the RFID antenna of the printer.

5. The method of claim 4, further comprising encoding, via the one or more processors, the second RFID tag using the RFID antenna while the second RFID tag is in the encoding position.

6. The method of claim 5, further comprising:

moving the second RFID tag from the encoding position to the respective print position; and printing, with the printhead of the printer, text, images, or machine-readable symbology onto the RFID label while the RFID label is at least in the print position.

7. The method of claim 1 further comprising creating, via a platen roller, an optimum pressure over the RFID label to drive the RFID label for printing.

8. A printer comprising:

an RFID antenna configured to communicate with an RFID tag of an RFID label when the RFID label is positioned at least partially within the printer; and one or more processors communicatively coupled with the RFID antenna, wherein the one or more processors are configured to:

identify a print position of the RFID label positioned within a printer, based on a position of a printhead in the printer;

identify an RFID communication window of the RFID antenna for an RFID tag of the RFID label, wherein the RFID communication window corresponds to a region where the RFID antenna is capable of encoding the RFID tag on the RFID label;

determine whether the RFID communication window for the RFID tag on the RFID label overlaps with the identified print position for the RFID label;

cause movement of the RFID label to the print position in an instance in which it is determined that the identified print position for the RFID label overlaps with the RFID communication window identified for the RFID tag of the RFID label;

encode the RFID tag using the RFID antenna while the RFID label is in the print position; and print, with the printhead of the printer, text, images, or machine-readable symbology onto the RFID label while the RFID label is at least in the print position.

9. The printer of claim 8, wherein the one or more processors are configured to identify a size of the RFID communication window for the RFID tag using an RFID calibration wizard.

10. The printer of claim 8, wherein the RFID communication window corresponds to a position of the RFID tag relative to the RFID antenna where the RFID antenna is capable of communicating with the RFID tag for encoding the RFID tag.

11. The printer of claim 8, wherein the one or more processors are configured to:

determine whether a position of a second RFID label in a respective print position would result in a second RFID tag of the second RFID label not overlapping the RFID communication window of the RFID antenna of the printer; and move the second RFID label to an encoding position in response to the determination that the position of the second RFID label in the respective print position would result in the second RFID tag of the second RFID label not overlapping the RFID communication window of the RFID antenna of the printer.

12. The printer of claim 11, wherein the one or more processors are configured to encode the second RFID tag using the RFID antenna while the second RFID tag is in the encoding position.

13. The printer of claim 12, wherein the one or more processors are configured to:

move the second RFID tag from the encoding position to the respective print position; and print, with the printhead of the printer, text, images, or machine-readable symbology onto the RFID label while the RFID label is at least in the print position.

14. The printer of claim 8, wherein a platen roller is configured to create an optimum pressure over the RFID label to drive the RFID label for printing.

* * * * *